UNITED STATES PATENT OFFICE.

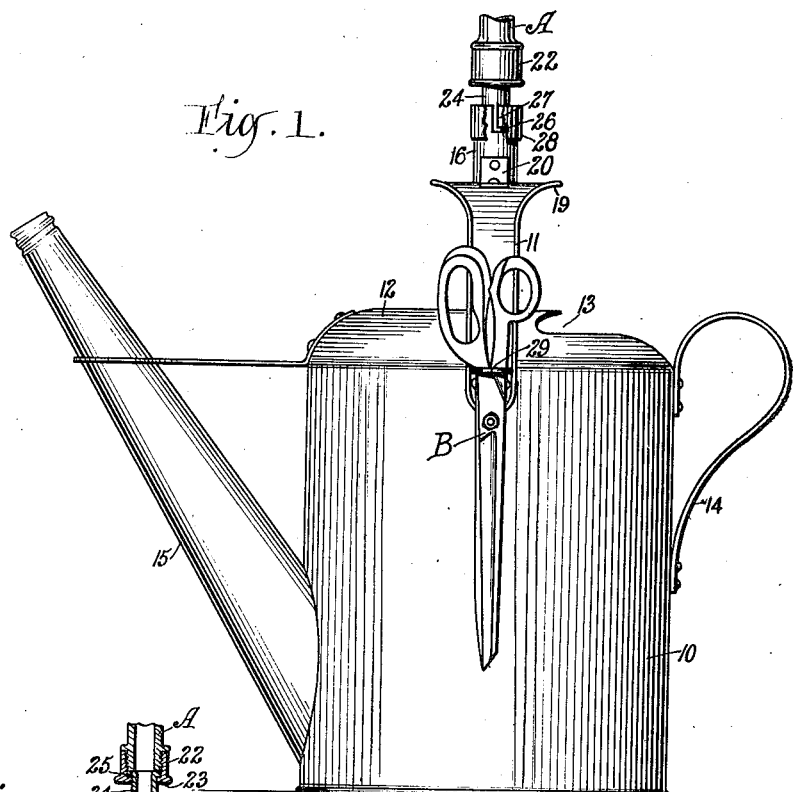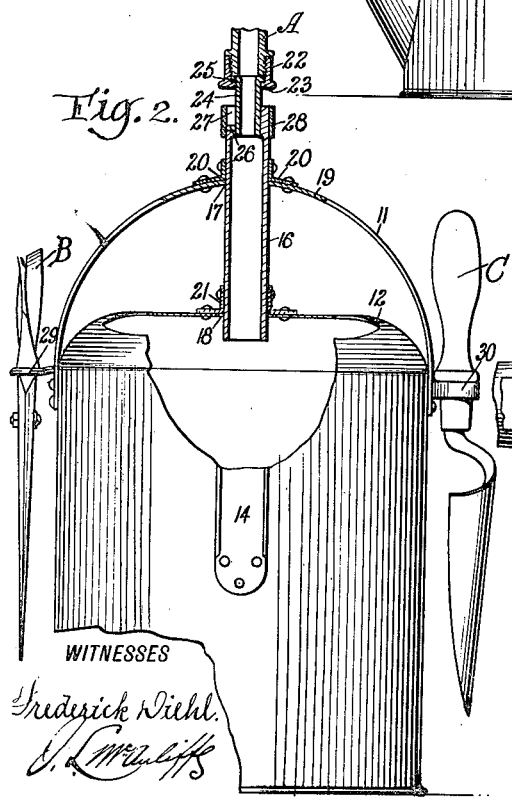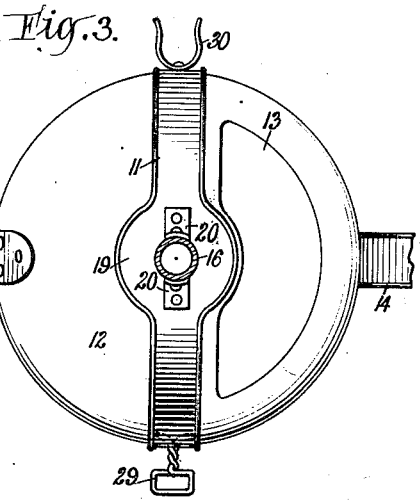

ALICE EMILY WILT, OF PHILADELPHIA, PENNSYLVANIA.

WATERING-POT.

1,271,405.

Specification of Letters Patent.

Patented July 2, 1918.

Application filed October 16, 1917. Serial No. 196,924.

*To all whom it may concern:*

Be it known that I, ALICE E. WILT, a citizen of the United States, and a resident of Germantown, Philadelphia, in the county of Philadelphia and State of Pennsylvania, have invented a new and Improved Watering-Pot, of which the following is a full, clear, and exact description.

My invention relates to watering pots for plants, etc., and has for an important object to improve the form of the ordinary watering pot whereby to overcome certain disadvantages in the use of the same more particularly to do away with the necessity of holding the pot with the hands under a spigot or hydrant with the attendant probability of the one holding the pot being splashed with water in the act of filling the pot by reason of water striking the top or guard of the pot. The stated object is attained by providing a novel arrangement of filler pipe with means to couple the same to the faucet or spigot.

More particular objects of the invention are to provide a simple arrangement of filler pipe and coupling means and to provide a strong connection of the same with the bail or handle and with the guard or top of the pot.

Reference is to be had to the accompanying drawings forming a part of this specification in which similar reference characters indicate corresponding parts in all the views, it being understood that the drawings are merely illustrative of one example of the invention.

Figure 1 is a side elevation of a watering pot embodying my invention, parts being broken away, the view including a fragment of a spigot;

Fig. 2 is a rear elevation of my improved watering pot, parts being broken away and others in transverse vertical section, the view being taken in a plane at right angles to Fig. 1;

Fig. 3 is a plan view with the filler pipe in section, the section being taken in a plane above the carrying bail or handle.

The invention in accordance with the illustrated example is embodied in a pot 10 which in the main may be of ordinary form having the essentials of a carrying bail or handle 11, a top or shield 12 shown with a filling opening 13 at one side, that is toward the rear side of the pot. At the rear the pot is shown as provided with a gripping handle 14 and at the front with a spout 15.

In accordance with my invention a filler pipe 16 is provided at the top of the pot and extends through a hole 17, formed for the purpose, in the bail 11, and through a registering hole 18 in the guard or top 12. To prevent undue weakening of the bail 11 by the presence of the hole 17 the bail is widened as at 19 to provide the necessary material for strength and also, advantageously, the filler pipe 16 is secured and positively fastened and the bail strengthened by reinforcing brackets 20 or like means here shown in the form of angle brackets riveted to the pipe and bail. Similarly brackets 21 are shown fastening the filler pipe to the shield 12.

A suitable coupling means is provided for permitting the ready attachment of the filler pipe to a spigot A and its ready detachment. In the illustrated example the terminal A of the spigot is shown as formed with external threads for receiving an ordinary garden hose coupling, and I apply to the said threaded terminal a sleeve 22 having an internal flange 23 at its lower end on which is seated the flanged upper end of a nipple 24, said nipple thus having a swivel connection with the spigot A. The nipple 24 has a lateral stud 26 near the lower end thereof adapted to be received in a bayonet slot 27 in the upper end of the filler pipe 16. Preferably the slotted upper end of the filler pipe has secured thereto a sleeve 28 which covers the bayonet slot at the side while permitting ready entrance and escape of the pin 26, the sleeve also serving to strengthen the slotted filler pipe. The swiveling of the nipple 24 serves the purpose that the same may be turned to dispose the pot in convenient position. The filler pipe 16 is illustrated as extending vertically throughout its length since the illustrated spigot terminal A is shown vertical and it will be readily understood that the upper end of the filler pipe and its coupling means will have an angle corresponding with the angular position of the spigot terminal while the major portion of the filler pipe will be vertical or substantially so.

The numeral 29 indicates a holding device for receiving a garden shears B, said holding device shown as in the form of a wire loop, the ends of which are twisted and passed through the side of the body of the pot and bent laterally in opposite directions, the ends being secured in any suitable manner. Preferably at a point diametrically opposite the shears holder 29 I provide a spring clip or holder 30 to receive a trowel C. The means to hold the shears and trowel are about 90° from the rear handle 14 whereby to dispose the trowel at such a distance from the handle 14 as to prevent any dirt adhering to the trowel from soiling the clothes of the user.

I wish to state in conclusion that although the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new and desire to secure by Letters Patent:

1. In a watering pot having a bail and a guard at the top of the pot below the bail; a filler pipe extending through the said bail and guard to the interior of the pot, and means to couple the upper end of the filler pipe to a source of water supply.

2. A watering pot including a bail at the top of the pot and a filler pipe extending through the bail and into the pot at the top, said filler pipe being secured to the said bail and extending above the same for connection with a source of water supply.

3. A watering pot having a guard at the top thereof, a bail above the said guard, registering holes in the guard and bail, and a filler pipe extending through the said guard and bail and fastened thereto, the upper end of the filler pipe rising above the said bail and being adapted for connection with a source of water supply.

4. A watering pot including a fixed bail on the pot at the top, said bail having a hole vertically therethrough at the approximate center, a filler pipe extending through the said hole to the pot and secured to the said bail, a nipple detachably connected with the upper end of the filler pipe above the bail, and means to swivel the said nipple on a spigot.

5. A watering pot having a carrying bail at the top, and a filler pipe extending through said bail, the upper end of the said filler pipe rising above the said bail and having means whereby to detachably connect the same with a source of water supply.

ALICE EMILY WILT.